(12) United States Patent
Fischer

(10) Patent No.: US 10,837,545 B2
(45) Date of Patent: Nov. 17, 2020

(54) OPERATING DEVICE FOR A MOTOR VEHICLE, AND MOTOR VEHICLE HAVING AN OPERATING DEVICE OF THIS TYPE

(71) Applicant: Bayerische Motoren Werke Aktiengesellschaft, Munich (DE)

(72) Inventor: Diana Fischer, Fraunberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/514,352

(22) Filed: Jul. 17, 2019

(65) Prior Publication Data

US 2019/0338848 A1   Nov. 7, 2019

Related U.S. Application Data

(63) Continuation of application No. PCT/EP2018/050952, filed on Jan. 16, 2018.

(30) Foreign Application Priority Data

Jan. 24, 2017 (DE) .................. 10 2017 201 058

(51) Int. Cl.
*F16H 59/02* (2006.01)
*F16H 59/04* (2006.01)
(Continued)

(52) U.S. Cl.
CPC ..... *F16H 59/0204* (2013.01); *F16H 59/0217* (2013.01); *F16H 59/04* (2013.01);
(Continued)

(58) Field of Classification Search
CPC ...... F16H 59/0204; F16H 59/04; F16H 59/10; F16H 59/0217; F16H 2059/026; F16H 2059/0282; F16H 2059/6807
See application file for complete search history.

(56) References Cited

U.S. PATENT DOCUMENTS

| | | |
|---|---|---|
| 2001/0026212 A1 | 10/2001 | Strohbeck |
| 2013/0186226 A1 | 7/2013 | Tovar et al. |

(Continued)

FOREIGN PATENT DOCUMENTS

| | | |
|---|---|---|
| DE | 100 62 891 A1 | 8/2001 |
| DE | 10 2010 024 388 A1 | 12/2011 |

(Continued)

OTHER PUBLICATIONS

International Search Report (PCT/ISA/210) issued in PCT Application No. PCT/EP2018/050952 dated Mar. 23, 2018 with English translation (four (4) pages).

(Continued)

*Primary Examiner* — Timothy Hannon
(74) *Attorney, Agent, or Firm* — Crowell & Moring LLP

(57) ABSTRACT

An operating device for a motor vehicle is provided. The device includes at least one selector lever, which can be moved between at least one parking position, as the first position for activating a parking lock of an automatic transmission, and at least one second position that is different to the parking position. The device includes at least two operating parts which are retained on a base element of the selector lever that can move between the positions, and which can be moved towards one another out of a deactivation position into an activation position, in order to thereby bring about a starting of a drive device of the motor vehicle, as well as a blocking device which is designed to block the operating parts in the activation position, and to bring about a movement of the operating parts out of the activation position into the deactivation position as a result of a movement of the selector lever out of the second position into the parking position.

17 Claims, 1 Drawing Sheet

(51) Int. Cl.
  *F16H 59/10* (2006.01)
  *F16H 59/68* (2006.01)
(52) U.S. Cl.
  CPC ....... *F16H 59/10* (2013.01); *F16H 2059/026* (2013.01); *F16H 2059/0282* (2013.01); *F16H 2059/6807* (2013.01)

(56) References Cited

U.S. PATENT DOCUMENTS

2016/0178050 A1\* 6/2016 Park .................... F16H 59/0278
 74/473.18
2019/0120370 A1\* 4/2019 Dimig ................. F16H 59/0278

FOREIGN PATENT DOCUMENTS

| DE | 10 2013 007 977 A1 | 11/2014 |
| DE | 10 2015 221 715 A1 | 6/2016 |
| EP | 1 770 311 A1 | 4/2007 |
| JP | 2006-176083 A | 7/2006 |

OTHER PUBLICATIONS

German-language Written Opinion (PCT/ISA/237) issued in PCT Application No. PCT/EP2018/050952 dated Mar. 23, 2018 (six (6) pages).
German-language Search Report issued in counterpart German Application No. PCT/EP2018/050952 dated Oct. 10, 2017 with English translation (11 pages).

\* cited by examiner

US 10,837,545 B2

OPERATING DEVICE FOR A MOTOR VEHICLE, AND MOTOR VEHICLE HAVING AN OPERATING DEVICE OF THIS TYPE

CROSS REFERENCE TO RELATED APPLICATIONS

This application is a continuation of PCT International Application No. PCT/EP2018/050952, filed Jan. 16, 2018, which claims priority under 35 U.S.C. § 119 from German Patent Application No. 10 2017 201 058.4, filed Jan. 24, 2017, the entire disclosures of which are herein expressly incorporated by reference.

BACKGROUND AND SUMMARY OF THE INVENTION

The invention relates to an operating device for a motor vehicle. The invention further relates to a motor vehicle having an operating device of this type.

An operating device of this type for a motor vehicle which is designed, for example, as a motor car, in particular as a passenger motor car, can already be taken as known from EP 1 770 311 A1, for example. In said document, the operating device has at least one selector lever which can be moved between a first position and at least one second position which is different from the first position. In said document, the first position is a parking position for activating a parking lock of an automatic transmission, wherein the parking position is usually designated P. The parking lock can be used to prevent, for example, the motor vehicle which is stopped on a slope for example from rolling away in an undesired manner, wherein parking locks of this type have long been known from the general prior art.

The first position is, for example, a driving position for setting a drive stage of the automatic transmission of the motor vehicle. The drive stage is, for example, a forward drive stage for effecting forward driving of the motor vehicle. As an alternative, it is contemplated for the drive stage to be a reverse drive stage for effecting reverse driving of the motor vehicle. The forward drive stage is usually also designated D, wherein the reverse drive stage is designated R for example. Furthermore, it is contemplated for the second position to be a neutral position, which is usually also designated N, for engaging an idling position of the automatic transmission.

An object of the present invention is to provide an operating device and a motor vehicle, so that particularly simple operation of the motor vehicle can be realized.

According to the invention, this and other objects are achieved by an operating device and by a motor vehicle having such an operating device in accordance with embodiments of the invention. Advantageous refinements of the invention are also provided according to various other embodiments.

A first aspect of the invention relates to an operating device for a motor vehicle which is designed, for example, as a motor car, in particular as a passenger motor car. The operating device has at least one selector lever which can be moved between at least one first position and at least one second position. In this case, the first position is a parking position for activating or engaging a parking lock of an automatic transmission of the motor vehicle, wherein the parking position is usually also designated P.

The second position, which is different from the first position, is, for example, a driving position for setting a drive stage of the automatic transmission of the motor vehicle. In this case, the motor vehicle has, for example, a drive train by way of which the motor vehicle can be driven. The drive train comprises the transmission and a drive motor which is designed, for example, as an internal combustion engine by way of which torques can be provided in order to drive the motor vehicle. The torques which are provided by the drive motor can be introduced, for example, into the automatic transmission and converted by way of the automatic transmission, so that the automatic transmission can then provide the converted torques in order to drive the motor vehicle.

The drive stage is, for example, a forward drive stage, so that the driving position is, for example, a forward driving position. The forward drive stage can be used to effect, for example, forward driving of the motor vehicle, wherein the forward drive stage or the forward driving position is usually also designated D. Furthermore, it is contemplated for the drive stage to be a reverse drive stage for effecting reverse driving of the motor vehicle, so that the driving position is, for example, a reverse driving position. The reverse drive stage or the reverse driving position is usually also designated R. Therefore, for example, a forward gear is engaged or activated as the forward drive stage by moving the selector lever into the forward driving position. For example, a reverse gear is engaged or activated as the reverse drive stage by moving the selector lever into the reverse driving position. In addition, the second position may be a neutral position, which is also designated N, for engaging an idling position of the automatic transmission.

In order to now be able to realize particularly simple operation of the motor vehicle, at least two operating parts which are held on a base element of the selector lever, it being possible for said base element to be moved between the positions, and can be moved between the positions together with the base element are provided according to the invention. In other words, the selector lever comprises the base element and the operating parts which are held, in particular in a movable manner, on the base element. Therefore, the operating parts can be moved between the positions together with the base element. In this case, the operating parts can be moved toward one another, in particular in a translatory manner, out of a deactivation position into an activation position in order to thereby effect starting of a drive device of the motor vehicle. The drive device is, for example, the abovementioned drive motor or comprises at least the drive motor. In other words, the drive device is designed in order to drive the motor vehicle, wherein the drive device comprises, for example, the drive motor and the automatic transmission. Furthermore, it is contemplated for the abovementioned drive motor to be an electric motor.

Furthermore, a locking device which is designed to at least temporarily lock the operating parts in the activation position is provided according to the invention. The locking device is further designed to effect or to permit a movement of the operating parts out of the activation position into the deactivation position as a result of a movement of the selector lever out of the second position into the parking position.

If, for example, the selector lever and therefore the base element and the operating parts are initially located in the parking position, and in this case the operating parts are initially located in the deactivation position, the drive device is, for example, initially deactivated and the parking lock is engaged or activated. As a result, the motor vehicle is secured against rolling away in an undesired manner by way of the parking lock, this being advantageous particularly when the vehicle is stopped or parked on a hill or on an incline. If, for example, a person, in particular the driver of the motor vehicle, then wishes to activate, that is to say for example to start, the drive device, in particular the drive motor, the person for example moves the operating parts, which are initially located in the deactivation position, toward one another and therefore into the activation position, wherein the selector lever can, for example, initially remain in the parking position. The drive device is activated by virtue of this movement of the operating parts out of the deactivation position into the activation position. If, for example, the person, in particular the driver of the motor vehicle, then wishes to carry out driving, in particular forward driving or reverse driving, of the motor vehicle, the person moves the selector lever out of the parking position into the second position which is designed as a driving position for example—in particular while the operating parts are located in the activation position. As a result, the parking lock is deactivated or disengaged, so that the motor vehicle can then be driven by way of the activated drive device and as a result can be driven forward or in reverse for example. After moving the operating parts out of the deactivation position into the activation position and in particular during movement of the selector lever out of the parking position into the second position and while the selector lever is located in the second position, the operating parts are secured or held in the activation position by way of the locking device, so that the operating parts cannot be moved out of the activation position into the deactivation position in an undesired manner. As a result, for example, the drive device remains activated, so that the motor vehicle can be driven by way of the drive device.

If, for example, the person, in particular the driver, then wishes to stop, in particular to park, the motor vehicle again after driving, the person, for example, stops the motor vehicle, wherein the selector lever is still located in the second position and the operating parts are still located in the activation position. If the motor vehicle is then at a standstill and the person wishes to activate the parking lock, the person moves the selector lever out of the second position into the parking position—in particular while the operating parts are still located in the activation position. This movement of the selector lever out of the second position into the parking position—while the operating parts are initially still located in the activation position and are still held in the activation position by way of the locking device—results in the locking device moving the operating parts, which are initially still located in the activation position, out of the activation position into the deactivation position or effecting or permitting a movement of this type of the operating parts. For example, the drive device is deactivated as a result of the movement of the operating parts out of the activation position into the deactivation position. Since, furthermore, the parking lock is activated or engaged by virtue of the movement of the selector lever out of the second position into the parking position, the motor vehicle is then securely stopped or parked. Following this, the person, in particular the driver, can then carry out renewed starting and renewed driving in the above-described manner.

The operating device according to the invention, in particular the selector lever comprising the operating parts, allows particularly easily understandable and observable or comprehensible operation of the motor vehicle, in particular of the automatic transmission and of the drive device. Furthermore, a reduction on expenditure for operation can be realized in comparison to conventional operating devices since at least two steps fewer have to be carried out, for example, in order to carry out driving of the motor vehicle and to park or stop the motor vehicle in comparison to conventional operating devices. In addition, the operating device according to the invention allows the number of operating elements arranged scattered throughout the interior of the motor vehicle to be kept low and in the process functions which are related to one another to be grouped together in the region of the selector lever, so that particularly simple and convenient and ergonomic operation of the motor vehicle can be provided. The above mentioned grouping of functions is realized, in particular, by virtue of the driver automatically moving the operating parts toward one another or pushing said operating parts together when the driver moves the selector lever out of the parking position into the second position and to this end touches, in particular holds or grasps, said selector lever. The drive device and therefore the motor vehicle are started in the process.

A movement of the operating parts out of the activation position into the deactivation position is effected, in particular automatically or independently or autonomously, when and preferably only when the driver moves or positions the selector lever, which is also designated gear selector switch (GWS), back into the parking position again, as a result of which the drive device and therefore the motor vehicle are deactivated or turned off. In this way, a so-called start/stop function for activating and deactivating the drive device or the motor vehicle overall is integrated into the operating parts, which are designed as casing shells for example, so that, for example, expenditure on operation for operating the motor vehicle can be kept particularly low.

In a particularly advantageous refinement of the invention, the selector lever comprising the base element and the operating parts can be moved in a translatory and/or rotary manner between the positions, as a result of which particularly simple and ergonomic operation can be realized.

Particularly ergonomic and therefore advantageous operation can be realized, in particular, by way of at least one subregion of the base element having a longitudinal extent and therefore a direction of longitudinal extent, so that at least the subregion of the base element is longer than it is wide.

In the process, it has been found to be particularly advantageous when the selector lever comprising the base element and the operating parts can be moved between the positions in a translatory manner along an axis and/or in a rotary manner about an axis, wherein the direction of longitudinal extent of the base element runs perpendicularly in relation to the axis. In this way, forces which are required to move the selector lever between the positions and are to be exerted onto the selector lever can be kept particularly low.

A further embodiment is distinguished in that the operating parts have respective areas which can be touched by the abovementioned person grasping and therefore touching the selector lever and therefore are haptically perceptible. The areas which can be touched and therefore are haptically perceptible are furthermore optically perceptible by the person and are therefore, for example, visible areas or visible sides. This means that the operating parts are not arranged, for example, in a housing and therefore concealed and not optically perceptible, but rather the operating parts are, for example, casing parts, in particular casing shells, which are haptically and optically perceptible by the person, in particular by the driver, in the completely produced state of the operating device and in particular of the motor vehicle. In this way, for example, the driver can both optically and also haptically perceive whether the operating parts are located in the activation position or in the deactivation position or are moved into the deactivation position or are moved into the deactivation position or activation position. Therefore, particularly comprehensible and simple operation can be realized.

In a further refinement of the invention, a recess which is in each case partially bounded by the operating parts is arranged between the operating parts in the deactivation position. In this way, for example, the driver can particularly advantageously optically and haptically perceive whether the operating parts are located in the activation position or else in the deactivation position. Therefore, particularly comprehensible and therefore simple operation can be realized.

In a particularly advantageous embodiment of the invention, a lighting device is provided, by way of which at least one subregion of the selector lever can be illuminated. In this way, the selector lever can also be particularly easily optically perceived even in the dark, so that advantageous and fault-free operation can be realized.

In this case, it has been found to be particularly advantageous when the subregion which can be illuminated by way of the lighting device is arranged in the recess. In other words, provision is preferably made for at least one subregion of the recess to be illuminated by way of the lighting device. In this way, the driver can particularly easily optically identify whether the operating parts are located in the activation position or else in the deactivation position.

Finally, it has been found to be particularly advantageous when the illuminable subregion of the recess is covered by the operating parts in the activation position. In this way, the driver can particularly easily and comprehensibly identify whether the operating parts are located in the activation position or in the deactivation position, so that fault-free operation can be provided.

A second aspect of the invention relates to a motor vehicle which is designed, for example, as a motor car, in particular as a passenger motor car, and comprises at least one operating device according to the invention in line with the first aspect of the invention. Advantages and advantageous refinements of the first aspect of the invention are considered to be advantages and advantageous refinements of the second aspect of the invention, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or functionally identical elements are provided with the same reference symbols throughout the figures.

Figure 1:
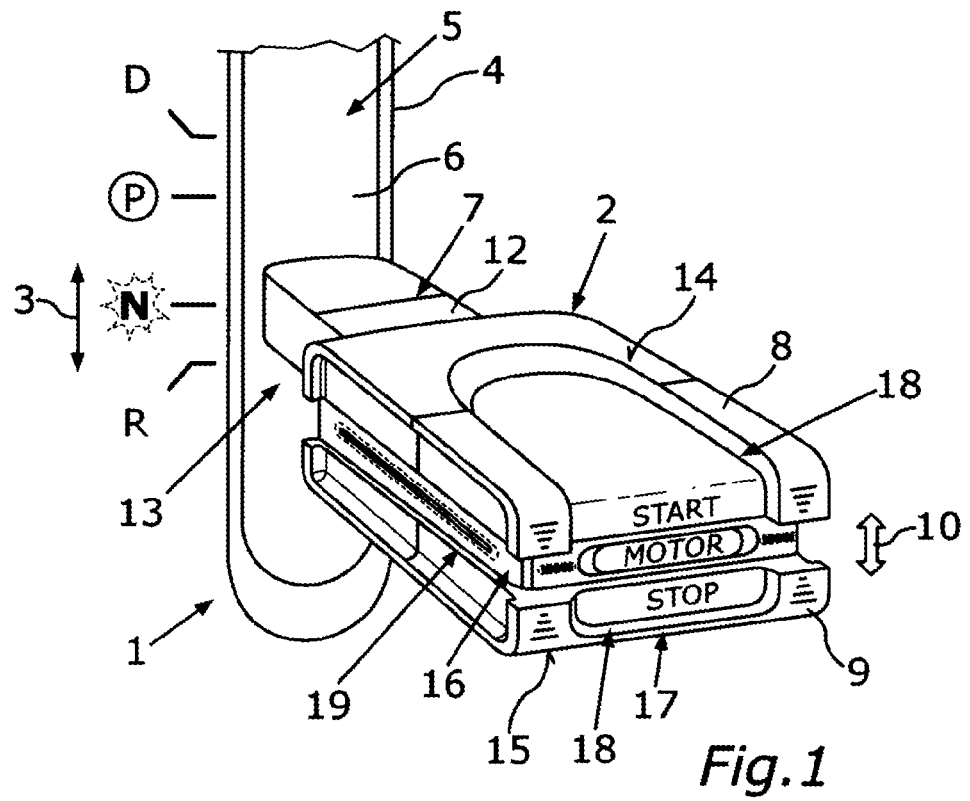
FIG. 1 is a schematic perspective view of a detail of an operating device according to an embodiment of the invention for a motor vehicle, comprising at least one selector lever which has a base element and at least two operating parts which are held in a movable manner on the base element and are located in a deactivation position.

FIG. 1 shows a schematic perspective view of an operating device, designated 1 overall, for a motor vehicle which is designed, for example, as a motor car, in particular as a passenger motor car. The motor vehicle comprises a drive train which has at least one drive device in order to drive the motor vehicle. The drive device comprises, for example, at least one internal combustion engine and/or at least one electric motor. The internal combustion engine or electric motor is a drive motor by way of which the motor vehicle can be driven. In particular, the drive motor is designed to provide torques in order to drive the motor vehicle. The drive device and therefore the drive train further comprise an automatic transmission by way of which the torques which are provided by the drive motor can be converted into torques which are different from said provided torques. The automatic transmission can provide the torques, so that the motor vehicle can be driven by way of the torques.

In this case, the operating device 1 comprises at least one selector lever 2 which, in the completely produced state of the motor vehicle, is arranged in the interior of said motor vehicle and—as will be explained further below—can be operated by a person, such as the driver of the motor vehicle for example, and therefore can be moved. The selector lever 2 can be moved, in particular by the driver, into a plurality of positions which differ from one another. A first of the positions is a parking position P for activating or engaging a parking lock of the automatic transmission. The automatic transmission has, for example, an output shaft which is mounted on a housing of the automatic transmission such that it can be rotated relative to the housing. By way of the output shaft, which is also designated transmission output shaft, the automatic transmission can provide the abovementioned torques in order to drive the motor vehicle. By activating or engaging the parking lock, the output shaft is secured, in particular in an interlocking manner, against rotation relative to the housing of the automatic transmission by way of at least one locking element. Since the output shaft is coupled to driveable wheels of the motor vehicle, the wheels are also secured against rotation by activating the parking lock, as a result of which the motor vehicle can be secured against rolling away in an undesired manner, for example, when it is stopped on an incline.

A second of the positions is a first driving position D, which is designed as a forward driving position, for setting a first drive stage, which is designed as a forward drive stage, of the automatic transmission, so that the first driving position D is a forward driving position. In other words, if the selector lever 2 is moved into the driving position D, the first drive stage, which is designed as a forward drive stage, of the automatic transmission is engaged or activated as a result. Forward driving of the motor vehicle can be effected by engaging the forward drive stage.

A third of the positions is a second driving position R, which is designed as a reverse driving position, for engaging or activating a second drive stage, which is designed as a reverse drive stage, of the automatic transmission. Reverse driving of the motor vehicle can be effected by way of the reverse drive stage, so that a reverse gear of the automatic transmission is engaged, for example, by engaging the reverse drive stage. A fourth of the positions is a neutral position N for engaging or activating an idling position of the automatic transmission.

The selector lever 2 can be moved between the positions which differ from one another, for example, along an axis which is illustrated in FIG. 1 by a double-headed arrow 3, in particular in a translatory manner. In this case, for example, a housing 4 of the operating device 1 forms a passage 5 along which the selector lever 2 can be moved between said positions, in particular along the axis. In this case, a casing element 6 which can be moved together with the selector lever 2 is provided for example, by way of which the passage 5 is at least partially, in particular at least predominantly, covered and therefore closed in the respective positions. Therefore, for example, no objects and no dirt can fall into the passage 5.

Figure 2:
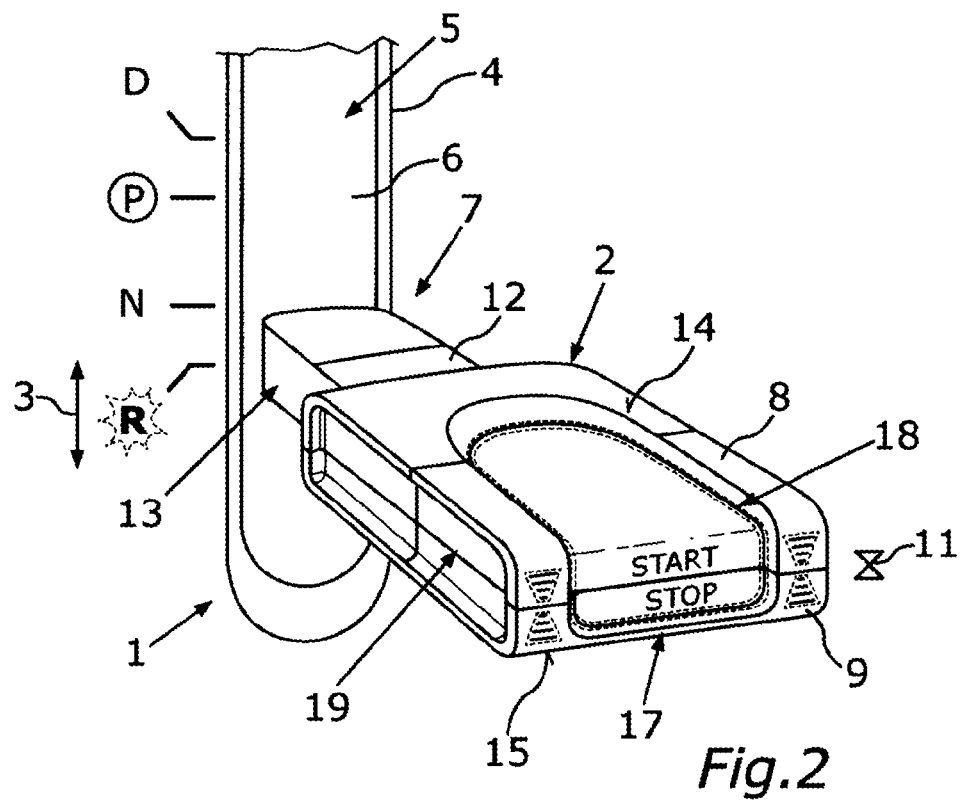
FIG. 2 is a schematic perspective view of a detail of the operating device, wherein the operating parts are located in their activation position.

In order to now realize particularly simple and therefore advantageous operation of the motor vehicle, the selector lever 2 has a base element 7 which can be moved between said positions, in particular along the axis, and at least two operating parts 8 and 9 which are held on the base element 7 and therefore can be moved between said positions together with the base element 7 and can be moved relative to the base element 7 between a deactivation position, shown in FIG. 1, and an activation position, shown in FIG. 2. In this case, the operating parts 8 and 9 can be moved toward one another out of the deactivation position into the activation position, so that, for example, the operating parts 8 and 9 are arranged closer to one another in the activation position than in the deactivation position.

In the exemplary embodiment shown in FIGS. 1 and 2, the operating parts 8 and 9 can be moved between the activation position and the deactivation position relative to the base element 7 in a translatory manner along a movement direction, shown by respective double-headed arrows 10 and 11. In order to therefore move, for example, the operating parts 8 and 9, which are initially located in the deactivation position, into the activation position, the operating parts 8 and 9 are moved toward one another along the movement direction, this being illustrated by the double-headed arrow 11 in FIG. 2. In order to move the operating parts 8 and 9, which are initially located in the activation position, into the deactivation position, the operating parts 8 and 9 are moved away from one another, in particular in a translatory manner, along the movement direction, this being illustrated by the double-headed arrow 11 in FIG. 1.

The abovementioned drive device, in particular the drive motor, is activated or started by virtue of moving the operating parts 8 and 9 out of the deactivation position into the activation position. The drive device, in particular the drive motor, is deactivated, for example, by virtue of moving the operating parts 8 and 9 out of the activation position into the deactivation position or as a result of a movement of this type of the operating parts 8 and 9 out of the activation position into the deactivation position. In this way, the operating parts 8 and 9 are used in order used a start/stop function in order to start or deactivate or stop the drive device, so that this start/stop function is integrated into the selector lever 2.

Furthermore, a locking device 12, which is particularly schematically illustrated in FIGS. 1 and 2, is provided, which is designed to lock or to hold the operating parts 8 and 9 in the activation position. Furthermore, the locking device 12 is designed to effect or to permit a movement of the operating parts 8 and 9 out of the activation position into the deactivation position as a result of a movement of the selector lever 2 out of one of the driving positions D and R or out of the neutral position N into the parking position P.

If, for example, the selector lever 2 is initially located in the neutral position N, while the operating parts 8 and 9 are located in the deactivation position, so that the drive device is deactivated, and, for example, the driver of the motor vehicle then wishes to activate the drive device and to effect or to carry out reverse driving of the motor vehicle, the driver, for example, holds or grasps the selector lever 2, in particular the operating parts 8 and 9, in order to move the selector lever 2 out of the neutral position N into the reverse driving position R. Since the driver holds or grasps the operating parts 8 and 9 in the process, the operating parts 8 and 9 are automatically moved out of the deactivation position into the activation position by the driver, as a result of which the drive device is started. The driver can then carry out reverse driving.

If the driver then wishes to park or to stop the motor vehicle, the driver moves, for example, the selector lever 2 out of the reverse driving position R, in particular via the neutral position N, into the parking position P. As a result of this movement of the selector lever 2 out of the reverse driving position R or out of the neutral position N into the parking position P, the locking device 12 effects a movement of the operating parts 8 and 9 out of the activation position into the deactivation position, and the drive device is deactivated and the parking lock is activated. In this way, the motor vehicle is secured against rolling away in an undesired manner. If the driver then wishes to carry out, for example, driving, in particular forward driving, of the motor vehicle, said driver moves the selector lever 2 out of the parking position P into the forward driving position D. In the process, the driver grasps the operating parts 8 and 9, as a result of which the operating parts 8 and 9 are moved out of the deactivation position into the activation position by the driver. The drive device is activated in this way. A movement of the operating parts 8 and 9 out of the activation position into the deactivation position is effected when and preferably only when the selector lever 2 is arranged in the parking position P again, as a result of which the drive device is switched off.

It can be seen particularly clearly in FIGS. 1 and 2 that at least one subregion 13 of the selector lever 2 has a direction of longitudinal extent which runs at least substantially perpendicularly in relation to said axis and in particular in relation to the direction of movement along which the operating parts 8 and 9 can be moved between the deactivation position and the activation position. Furthermore, the operating parts 8 and 9 are designed as casing parts, in particular as casing shells, of the selector lever 2, so that the operating parts 8 and 9 have respective areas 14 and 15 which can be touched by the driver grasping and therefore touching the selector lever 2 and therefore are haptically perceptible. In this case, the areas 14 and 15 are visible areas or visible sides which are also optically perceptible by the driver.

Furthermore, provision is made for a recess 16 which is in each case partially bounded by the operating parts 8 and 9 to be arranged between the operating parts 8 and 9 in the deactivation position, which recess is designed as a groove in the exemplary embodiment illustrated in the figures. The recess 16, which is designed as a gap or a groove for example, is at least predominantly, in particular completely, closed by moving the operating parts 8 and 9 out of the deactivation position into the activation position. In order to move the operating parts 8 and 9 out of the deactivation position into the activation position, the operating parts 8 and 9 are pressed together by the driver for example, as a result of which a function of a start button is realized. During driving, the operating parts 8 and 9 remain closed and therefore in the activation position since the operating parts 8 and 9 are held in the activation position by way of the locking device 12. The operating parts 8 and 9 are opened, that is to say moved apart and therefore into the deactivation position, only when the selector lever 2 is moved into the parking position P. In other words, the operating parts 8 and 9 are moved out of the activation position into the activation position, in particular by way of at least one spring element, only when the drive device is deactivated. The spring element is tensioned, for example, at least in the activation position and provides a spring force by way of which the operating parts 8 and 9 can be moved out of the activation position into the deactivation position.

Furthermore, the operating device 1 comprises at least one lighting device 17 by way of which respective subregions 18 and 19 of the selector lever 2 can be illuminated. In particular, provision is made for the subregions 19 to be illuminated by way of the lighting device 17 in the deactivation position, wherein the subregions 19 are arranged in the recess 16 or are parts of the recess 16. In this way, the recess 16 is at least partially illuminated by way of the lighting device 17 in the deactivation position for example. In particular, the subregions 19 are illuminated by way of the lighting device 17 in the deactivation position, whereas the subregions 18 is not illuminated. However, for example, the subregions 18 are illuminated by way of the lighting device 17 in the activation position. In order to realize particularly comprehensible and therefore simple and ergonomic operation, provision is further made for the illuminable subregions 19 of the recess 16 to be covered by the operating parts 8 and 9 in the activation position, as a result of which the driver can particularly easily optically identify whether the operating parts 8 and 9 are located in the activation position or in the deactivation position.

LIST OF REFERENCE SYMBOLS

1 Operating device
2 Selector lever
3 Double-headed arrow
4 Housing
5 Passage
6 Casing element
7 Base element
8 Operating part
9 Operating part
10 Double-headed arrow
11 Double-headed arrow
12 Locking device
13 Subregion
14 Area
15 Area
16 Recess
17 Lighting device
18 Subregions
19 Subregions
D Forward driving position
N Neutral position
P Parking position
R Reverse driving position The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating device for a motor vehicle, comprising:
   at least one selector lever which is movable between at least one parking position as a first position for activating a parking lock of an automatic transmission of the motor vehicle;
   at least one second position which is different from the parking position;
   at least two operating parts that are held on a base element of the selector lever, wherein the base element is movable between the positions, and the operating parts are movable toward one another out of a deactivation position into an activation position in order to thereby effect starting of a drive device of the motor vehicle; and
   a locking device which is designed:
      to lock the operating parts in the activation position; and
      to effect a movement of the operating parts out of the activation position into the deactivation position as a result of a movement of the selector lever out of the second position into the parking position.

2. The operating device according to claim 1, wherein
   the selector lever comprises the base element and the operating parts, and
   the selector lever is movable in a translatory and/or rotary manner between the positions.

3. The operating device according to claim 2, wherein at least one subregion of the base element has a direction of longitudinal extent.

4. The operating device according to claim 3, wherein
   the selector lever comprising the base element and the operating parts is movable between the positions in the translatory manner along an axis and/or in the rotary manner about an axis, and
   the direction of longitudinal extent of the base element runs perpendicularly in relation to the axis.

5. The operating device according to claim 4, wherein
   the operating parts have respective areas which are touchable by a person grasping and therefore touching the selector lever, and therefore are haptically perceptible.

6. The operating device according to claim 5, wherein
   a recess which is in each case partially bounded by the operating parts is arranged between the operating parts in the deactivation position.

7. The operating device according to claim 5, wherein a lighting device is provided, by way of which at least one subregion of the selector lever is illuminable.

8. The operating device according to claim 7, wherein the subregion which is illuminable by way of the lighting device is arranged in the recess.

9. The operating device according to claim 8, wherein the illuminable subregion of the recess is covered by the operating parts in the activation position.

10. The operating device according to claim 2, wherein
    the selector lever comprising the base element and the operating parts is movable between the positions in the translatory manner along an axis and/or in the rotary manner about an axis, and
    a direction of longitudinal extent of the base element runs perpendicularly in relation to the axis.

11. The operating device according to claim 1, wherein at least one subregion of the base element has a direction of longitudinal extent.

12. The operating device according to claim 1, wherein
    the operating parts have respective areas which are touchable by a person grasping and therefore touching the selector lever, and therefore are haptically perceptible.

13. The operating device according to claim 1, wherein
    a recess which is in each case partially bounded by the operating parts is arranged between the operating parts in the deactivation position.

14. The operating device according to claim 13, wherein a subregion which is illuminable by way of a lighting device is arranged in the recess.

15. The operating device according to claim 14, wherein the illuminable subregion of the recess is covered by the operating parts in the activation position.

16. The operating device according to claim 1, wherein a lighting device is provided, by way of which at least one subregion of the selector lever is illuminable.

17. A motor vehicle comprising:
at least one operating device according to claim 1.

\* \* \* \* \*